(12) United States Patent
Glasco, Jr. et al.

(10) Patent No.: US 11,893,116 B2
(45) Date of Patent: *Feb. 6, 2024

(54) ASSESSMENT PLUG-IN SYSTEM FOR PROVIDING BINARY DIGITALLY SIGNED RESULTS

(71) Applicant: Bank of America Corporation, Charlotte, NC (US)

(72) Inventors: Jeffrey Glasco, Jr., Fort Mill, SC (US); Benjamin Daniel Hardman, Harrisburg, NC (US); Robert Brice, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 348 days.

This patent is subject to a terminal disclaimer.

(21) Appl. No.: 17/406,227

(22) Filed: Aug. 19, 2021

(65) Prior Publication Data
US 2023/0055463 A1  Feb. 23, 2023

(51) Int. Cl.
*G06F 21/57* (2013.01)
*H04L 9/32* (2006.01)

(52) U.S. Cl.
CPC ............ *G06F 21/57* (2013.01); *H04L 9/3247* (2013.01); *G06F 2221/034* (2013.01); *G06F 2221/2115* (2013.01)

(58) Field of Classification Search
CPC ............... G06F 21/57; G06F 2221/034; G06F 2221/2115; G06F 2221/2101;
(Continued)

(56) References Cited

U.S. PATENT DOCUMENTS 7,225,133 B1  5/2007 McIntosh
7,774,824 B2 * 8/2010 Ross ................... G06Q 20/382
705/73

(Continued)

FOREIGN PATENT DOCUMENTS

CN   105701009   6/2016
CN   115129574   9/2022
(Continued)

*Primary Examiner* — Christopher A Revak
(74) *Attorney, Agent, or Firm* — Weiss & Arons LLP

(57) ABSTRACT

A method for determining third party network compliance with a host entity network is provided. The method may include generating a scanning file that includes host entity network compliance standards and transferring the scanning file to an intermediary entity network. The method may further include generating an executable file that may run a plug-in scanning file to scan hardware and software resident at the third-party network for compliance. The method may further include transferring the executable file from the intermediary entity network to the third party network. The method may further include executing the executable file, generating a log file upon the completion of the running of the plug-in scanning file and digitally signing the log file. The method may further include deciphering the log file at the intermediary entity network, generating a readable report based on the deciphering and transferring the readable report to the host entity network.

20 Claims, 7 Drawing Sheets

(58) Field of Classification Search
CPC ... G06F 21/577; H04L 9/3247; H04L 63/126; H04L 63/1433; H04L 67/53
See application file for complete search history.

(56) References Cited

U.S. PATENT DOCUMENTS

| | | | |
|---|---|---|---|
| 8,423,963 B2 | 4/2013 | Garbers et al. | |
| 8,683,554 B2 | 3/2014 | Martin et al. | |
| 9,270,677 B1* | 2/2016 | Feeser | G06F 21/57 |
| 9,697,362 B2 | 7/2017 | Kaplan et al. | |
| 9,824,222 B1 | 11/2017 | Kaplan et al. | |
| 10,268,817 B1 | 4/2019 | Pham et al. | |
| 10,341,321 B2 | 7/2019 | Kumar et al. | |
| 10,574,702 B1 | 2/2020 | Rickerd et al. | |
| 10,614,223 B2 | 4/2020 | Abramovsky et al. | |
| 10,686,821 B2* | 6/2020 | Eskandari | G06F 8/74 |
| 10,911,495 B2 | 2/2021 | Dixit et al. | |
| 11,018,939 B1 | 5/2021 | Harris | |
| 11,025,675 B2 | 6/2021 | Barday et al. | |
| 11,146,584 B1* | 10/2021 | Hicks | H04L 63/12 |
| 11,310,259 B2 | 4/2022 | Jenkins et al. | |
| 11,388,195 B1* | 7/2022 | McCaffery | H04L 63/20 |
| 2004/0192306 A1 | 9/2004 | Elkarat et al. | |
| 2010/0154026 A1* | 6/2010 | Chatterjee | G06F 21/126 |
| | | | 726/1 |
| 2014/0095286 A1 | 4/2014 | Drewry et al. | |
| 2015/0222549 A1 | 8/2015 | Kakadia et al. | |
| 2018/0088973 A1 | 3/2018 | Subhraveti | |
| 2018/0189517 A1* | 7/2018 | Larson | G06F 21/6245 |
| 2018/0205701 A1* | 7/2018 | Kakhandiki | G06F 21/57 |
| 2018/0373615 A1 | 12/2018 | Xia et al. | |
| 2019/0280952 A1 | 9/2019 | Sizer et al. | |
| 2019/0340026 A1 | 11/2019 | Manda et al. | |
| 2020/0050386 A1 | 2/2020 | Natarajan et al. | |
| 2020/0106793 A1 | 4/2020 | Vanamali | |
| 2020/0228570 A1* | 7/2020 | Strosaker | H04L 63/20 |
| 2020/0242254 A1 | 7/2020 | Velur et al. | |
| 2020/0250316 A1 | 8/2020 | Rickerd et al. | |
| 2020/0320418 A1 | 10/2020 | Aminian et al. | |
| 2020/0382499 A1* | 12/2020 | Sosiade | H04L 9/3239 |
| 2021/0081632 A1 | 3/2021 | Batchu et al. | |
| 2021/0117236 A1 | 4/2021 | Patel et al. | |
| 2021/0203508 A1 | 7/2021 | Decoux et al. | |
| 2022/0413883 A1* | 12/2022 | Clebsch | H04L 63/123 |
| 2023/0014242 A1* | 1/2023 | Dangu | H04L 67/53 |
| 2023/0055215 A1* | 2/2023 | Glasco, Jr. | H04L 41/069 |

FOREIGN PATENT DOCUMENTS

| | | | | |
|---|---|---|---|---|
| EP | 0813133 A1 * | 12/1997 | | G06F 1/00 |
| WO | WO 2009/097350 A1 * | 8/2009 | | H04W 12/08 |

* cited by examiner

ASSESSMENT PLUG-IN SYSTEM FOR PROVIDING BINARY DIGITALLY SIGNED RESULTS

FIELD OF TECHNOLOGY

Aspects of the disclosure relate to third party assessment. Specifically, aspects of the disclosure relate to assessment plug-in system and methods for determining third party compliance with a host entity.

BACKGROUND OF THE DISCLOSURE

Entities running digital networks often utilize third party networks in conjunction with their own networks. For example, the entity may contract with a third party vendor to perform a service. Performance of the service may involve the third party's network running on, or in connection with, the entity's network.

Entities that utilize third party vendors for their operations typically maintain specific standards that may be expected of the networks associated with third party vendor to comply with. The entity may have security or other control requirements and standards for its digital environment. When a third party's network is running on, or in connection with, the entity's network, the entity's environment may be jeopardized if the third party network does not comply with the control requirements of the entity network.

In order to maintain a high level of security within the organization, third party assessment for network compliance may be performed. Entities may prefer to create specific standards of network compliance for each of the third party networks as oppose to using a pre-set template designed by an intermediary entity.

Third party vendors may be willing to comply with the specific standards the organization may require, however, the third party vendors may need assurance that their privacy and security within their networks will not be compromised. Third party vendors may not be willing to allow an organization to enter their network to assess that the standards are met.

Therefore, it would be desirable, to have systems and methods for assessing third party network compliance without having access to the third party network.

Additionally, third party network compliance scans typically operate by executing manual weekly, monthly and/or annual assessments. The efforts required for manual operations may be cumbersome. Furthermore, many vulnerabilities may incur in between assessments and build up into larger and more complicated vulnerabilities by the time the assessment is performed and the vulnerability is identified.

Therefore, it would be further desirable, for systems and methods to execute ongoing third party assessment scans at the third party vendor networks.

SUMMARY OF THE DISCLOSURE

A method for determining third party network compliance with a host entity network is provided. The method may include gathering host entity network compliance standards. The host entity network compliance standards may include security assessment standards, data movement controls, hardware requirements, software requirements and configuration settings.

The method may include generating a scanning file that includes the host entity network compliance standards.

In response to the generating of the scanning file, the method may include generating an executable file that, when executed, runs a plug-in scanning file. The plug-in scanning file may be run at a third party network. The plug-in scanning file, when run, may be configured to scan hardware and software resident at the third party network for compliance with the host entity network compliance standards.

The method may further include transferring the executable file to the third party network.

The method may further include executing the executable file. The executing may include running the plug-in scanning file. The plug-in scanning file may be for testing the hardware and software resident at the third party network for compliance with the host entity network compliance standards.

Upon completion of the running of the plug-in scanning file, the method may include generating a log file.

The method may further include digitally signing the log file. Digitally signing may encrypt the log file with digital codes that may be difficult to duplicate and/or change. The digitally signing may convert the log file to an immutable log file.

The method may also include transmitting the executable file and the immutable log file to the host entity network. At the host entity network, the method may include deciphering the immutable log file.

Based on the deciphering, the method may include generating a readable report.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
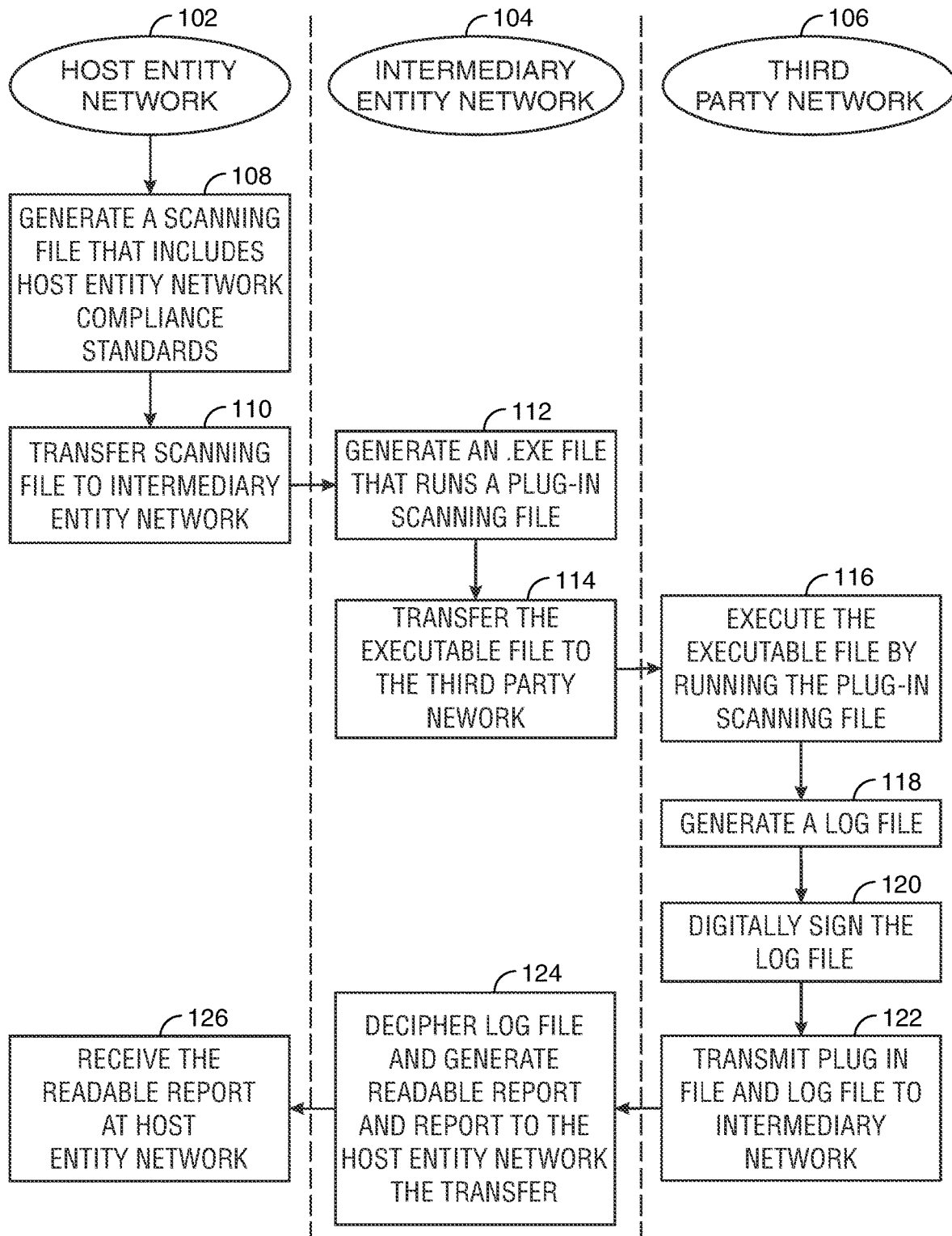
FIG. 1 shows an illustrative flowchart in accordance with principles of the disclosure.

A method for determining third party network compliance with a host entity network is provided. The host entity network may be associated with a host entity. The host entity may utilize third party vendors for different operations within the organization.

Third party vendors may provide products or services to an organization's customers on its behalf. Third party vendors may assist the organization to maintain daily business operations. Third party vendors may include cloud-service providers that may provide tools to enable the company to manage financials.

Third party vendors may utilize application programs, internet, cloud storage and any other suitable software and/or devices for managing their operations. This may all be included within the third party network environment.

The method may include determining host entity network compliance standards. These standards may be used for each third party network associated with the host entity network. The standards, in some embodiments, may be customized for each third party network associated with the host entity network.

The method may include gathering the host entity network compliance standards. The host entity network compliance standards may include a plurality of security assessment standards, a plurality of data movement controls, a plurality of hardware requirements, a plurality of software requirements and a plurality of configuration settings.

Exemplary security assessment standards may include one or more security settings or protocols.

Exemplary data movement controls may include one or more data traffic, data management and/or network requirements.

Exemplary hardware requirements may include one or more baseline hardware types or model numbers.

Software requirements may include lists of different types of software that may be used by the third party network and/or accessed by the third party network and a version type required for each listed software.

Configuration settings may include a list of settings that may be associated with the third party network. The settings may include a specific setting. The settings may include a range of settings that may pass as an allowable setting.

The method may include generating a scanning file that may include all of the host entity network compliance standards that may be scanned for at the third party network.

It should be appreciated that in some embodiments, based on the third party network, the scanning file may preferably compile a selected portion of the host entity network compliance standards to be scanned at the third party network. The selected portion may be dependent on the type of third party associated with the third party network.

The method may further include, following the generating of the scanning file, transferring the scanning file to an intermediary entity network. An exemplary intermediary entity may include Qualys®.

The intermediary entity network may be associated with an intermediary entity that may run, manage and handle third party assessment scans for a plurality of third party vendors for a plurality of host entities. The intermediary entity network may not be an entity specific to a single host entity.

It should be appreciated that the intermediary entity network may shield a third party network from accessing data at the host entity network. Following the executing of the scanning file at the third party network, the results may be transmitted to the host entity network and there may be no access to internal data associated with the host entity network.

The intermediary entity network may shield the host entity network from accessing data at the third party network. The third party may run the scanning file within their network and may only transfer the results of the scan to the host entity network thereby protecting the third party network data from being viewed and accessed by the host entity network.

The method may further include generating an executable file. The executable file may be operable to execute the scanning file for plug-in execution at the third party network.

The method may also include transferring the plug-in executable file from the intermediary entity network to the third party network.

The method may further include executing the plug-in executable file at the third party network. The executing may include testing the third party network for a level of compliance with the host entity network compliance standards.

The plug-in executable file may execute the scanning file at the third party network. The scanning file may scan the applications, systems and networks of the third party to identify and assess security and compliance within the third party network.

Each host entity network compliance standard that may be included in the generated scanning file may be assessed at the third party network. In some embodiments, the host entity network may include a list of pre-defined rules and associated requirements stored in a database at the host entity network, that need to be identified and matched at the third party network. The scanning file, when executed at the third party network, may retrieve the list from the third party network, scan the third party network for each pre-defined rule and determine whether third party network meets the requirements associated with each pre-defined rule.

Standards and rules set by the host entity network may include checking the availability and protection of communication ports. Checking the maintenance of the security log logging into the network may be another standard that may be crucial to protect the privacy of data within each network. This may include checking the types of passwords allowed and determining that passwords are changed on a steady basis.

In addition, third party networks may be scanned to identify that biometric authorization may be in place for users and that the biometric authorization is implemented.

Antivirus software is another area that may be scanned to determine that the software is running and updated to the latest version. Additionally, the scanning may determine whether or not the antivirus software is being compromised.

The location of a user's login to the third party network may be reviewed to determine that it is a secure location. The scanning may review the history of user's login.

Additionally, the scanning may scan to identify any possibilities of external security breach attempts.

In response to a completion of the executing of the scanning file at the third party network, the method may include generating a log file.

A log file may be a computer-generated data file that contains information about usage patterns, activities, and operations within an operating system, application, server or another device. Software and hardware developers may be enabled to troubleshoot and debug when they access a textual record of the events that the system may be producing.

The log file may include each hardware and software associated with the network and the status for each one. The status may include a version type, a version name, date and whether the hardware and/or software is compliant with the host entity network compliance standards.

The method may further include digitally signing the log file using the executable file at the third party network. The digitally signing may convert the log file to an immutable log file. By digitally signing the log file, the log file may be locked and changes or deletions may not be enabled. This may prevent the third party network from reviewing the log file and attempting to make any changes to cover up risks that may be identified at their network.

It should be appreciated that the immutable log file may not include identifying data associated with the third party network.

The method may further include transmitting the plug-in executable file with the immutable log file to the intermediary entity network.

The method may further include deciphering the immutable log file at the intermediary entity network.

At the intermediary entity network, when in response to the deciphering of the immutable log file one or more failures of one or more compliance standards are identified, the method may include automatically correcting the failure.

For example, when one of the software standards include a latest version of an anti-virus software to be used by the third party network and the software standard fails, the method may include searching the internet, via the intermediary entity network, for a latest version of the anti-virus software and automatically updating the third party network with the latest version of the anti-virus software.

Based on the deciphering, the method may include generating a readable report. The readable report may include failures that may be identified and already corrected by the intermediary entity network. The failures that may be corrected may include a description of the correction performed by the intermediary entity network.

The readable report may include a list of all the standards and requirements included in the host entity network compliance standards. The report may further include whether the standard and/or requirement was determined to be met or whether it failed.

Additionally, when one or more compliance standards associated with configuration settings are identified to be a failure, the method may include automatically changing a setting, using the plug-in, by the intermediary entity network, to comply with the compliance standard.

For example, if a setting is set to allow files to be sent outside the network and the host entity compliance standard does not allow for files to be sent outside the network, the plug-in may automatically change the setting to comply with the host entity compliance standard.

In another example, if usernames and passwords are not being changed as to a protocol set by the host entity, the network settings may readjust the expiry date for passwords.

The method may also include transferring the readable report to the host entity network. In some embodiments, the method may also include transferring the readable report to the third party network.

Following the transferring, the host entity network may receive the readable report for review.

The host entity network may include a host entity network platform. The platform may be accessed by developers and users of the network. The platform may include a user interface ("UI") for displaying each third party network and the results of the scanning performed at each third party network.

The UI may display the log file. The UI may display alongside the log file, the readable report. Any failures may be displayed as an alert on the UI.

In some embodiments, the standards that may have failed may be fixed automatically and in real-time. In other embodiments, a list may be generated in order of severity and may be handled. The system may also generate, based on the generated log file, a list of failed standards that may include external breach attempts, non-accepted log in locations, failed passwords, software and hardware applications that are not up to date. The list may be used in a subsequent scan to determine whether the failed standards have been corrected.

In some embodiments, the third party network may be a first third party network. When scanning first third party network the scanning may identify that the first third party network is host to a second third party network (i.e., a nested target network). The method may further include running the executable file at the second third party network to scan the second third party network for compliance with the host entity network.

The method may further include effectively performing a recursion of the process performed by the host entity network and the first third party network with the host entity network and the second third party network. The recursion may be further performed for any successive nested target networks identified in any downstream target networks.

In some embodiments, a method for executing an ongoing third party network compliance scan is provided. The method may include generating a scanning file that includes a plurality of host entity network compliance standards.

Following the generating of the scanning file, the method may include performing, periodically, a series of actions. The periodically performing may be automatically executed. The periodic performing may be set to a pre-determined interval. The series of actions may be performed at five minute intervals. The series of actions may be performed at ten minutes. The pre-determined interval may vary depending on a type of network of the third party vendor.

When performing the executing of the scanning file repeatedly at intervals that are close in time, the assessment scan may capture vulnerabilities in real-time and on-time. On-time identification of vulnerabilities may enable the host entity network to provide greater protection and security at the host entity network.

The first step in the series of actions may include executing a plug-in executable file at the third party network. The executable file may be operable to execute the scanning file for plug-in execution at the third party network. The executing may be for testing the third party network for a level of compliance with the plurality of host entity network compliance standards.

Based on the executing of the scanning file, the method may include executing the second step in the series of actions. The second step in the series of actions may include generating a log file at the plug-in executable file.

The method may also include executing a third step in the series of actions. The third step in the series of actions may include, using the executable file, digitally signing the log file at the third part network. The digitally signing may automatically convert the log file to an immutable log file.

The method may include executing a fourth step in the series of actions. The fourth step in the series of actions may include generating a readable report based on the immutable log file.

The method may include executing a fifth step in the series of actions. The fifth step in the series of actions may include transferring the readable report to the host entity network.

The readable report including the results from each execution may be transmitted and stored at the host entity network for review. Because of the ongoing running of the scanning file, when an error or a failure occurs that may require immediate attention, the system may be configured to transmit a second log file to the host entity defining the error(s)

and/or failure(s). The second log file may be separate from the log file to enable immediate identification of the errors and/or failures.

The failure may be directed to a failure of one or more of the host entity network compliance standards. The second report may specify the type of failure. It should be appreciated that the type of failure specified may not include any data or portions of data that may expose privacy information and/or compromise on the security and privacy of the third party vendor.

In some embodiments, when one or more failures are identified, the method may include reducing a duration of a time lapse between each series of actions to half the duration. For example, when the series of actions is being performed every ten minutes, the method may include decreasing a gap of time between each performing to half the amount of time. In this example, the method may include performing the series of actions every five minutes.

A system for determining third party network compliance with a host entity network is provided. The system may include the host entity network, an intermediary entity network and a third party network.

The host entity network may be configured to construct a scanning file. The scanning file may include host entity network compliance standards stored on the host entity network. The host entity network compliance standards may include security assessment standards, data movement controls, hardware requirements, software requirements and configuration settings.

Following the constructing of the scanning file, the host entity network may be configured to transmit the scanning file to the intermediary entity network.

The intermediary entity network may be configured to receive the scanning file from the host entity network. In response to the receipt of the scanning file, the intermediary entity network may be configured to generate an executable file. The executable file that, when executed, may run a plug-in scanning file. The plug-in scanning file may be for running at a third-party network. The plug-in scanning file, when run, may be configured to scan hardware and software resident at the third-party network for compliance with the host entity network compliance standards.

The intermediary network may be further configured to transmit the executable file to the third party network.

The system may be configured to perform periodically a series of actions. The series of actions may include, at the third party network, receiving the executable file. In response to the receipt of the executable file, third party network may be configured to execute the executable file. The execution may include running the plug-in scanning file. The plug-in scanning file may be for testing the hardware and software resident at the third party network for compliance with the host entity network compliance standards.

Upon the completion of the running of the plug-in scanning file, a log file may be generated. The third party network may be configured to digitally sign the log file. The digitally signing may convert the log file to an immutable log file.

In response to the signing, the third party network may transmit the executable file and the immutable log file to the intermediary entity network.

The intermediary entity network may be further configured to receive the plug-in executable file and the immutable log file. The intermediary entity network may be configured to decipher the immutable log file.

Based on the deciphering, the intermediary entity network may be configured to generate a readable report and transmit the readable report to the host entity network.

In some embodiments, the system may be configured to periodically repeat the series of actions included in the scanning. This may enable scanning the third party network continuously to identify any vulnerabilities and failures in the network.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative flowchart of the method steps that may be included in a third party assessment plug-in system in accordance with principles of the disclosure.

The system may include a host entity network 102, an intermediary entity network 104 and a third party network 106.

Step 108 may be executed at the host entity network 102. At step 108, a scanning file may be generated that includes a plurality of host entity network compliance standards. Generating the scanning file at the host entity network 102 may enable the host entity to create a scanning file in accordance with the host entity network requirements.

At step 110, at the host entity network 102, the scanning file may be transferred to the intermediary entity network 104.

At step 112, at the intermediary entity network 104, an executable file may be generated to execute the scanning file for plug-in at the third party.

At step 114, the plug-in executable file may be transferred to the third party network.

At step 116, at the third party network, the plug-in file may be executed for testing for third party compliance based on the compliance standards included in the scanning file.

Results of the execution of the scanning file may be generated into a log file, as shown at step 118 at the third party network 106.

In order to maintain the log file as is generated and not enable any user to make changes to the log file, the log file may be digitally signed and may convert the log file to an immutable log file, as shown at step 120.

At step 122, the plug-in executable file and the immutable log file may be transmitted to the intermediary network 104.

At step 124, the immutable log file may be deciphered. The deciphering may include converting the binary format of the log file to a readable format. Each '0' and '1' may be converted to a 'pass' or 'fail'. Additionally, the source of the control and/or standard tested may be converted to a name of the location that may be simpler for a user to decipher.

It should be appreciated that the binary log file may not include any data that may be associated with internal data of the third party network.

The readable report may be transmitted to the host entity network 102. The host entity network 102 may receive the readable report, as shown at step 126 for review.

Figure 2:
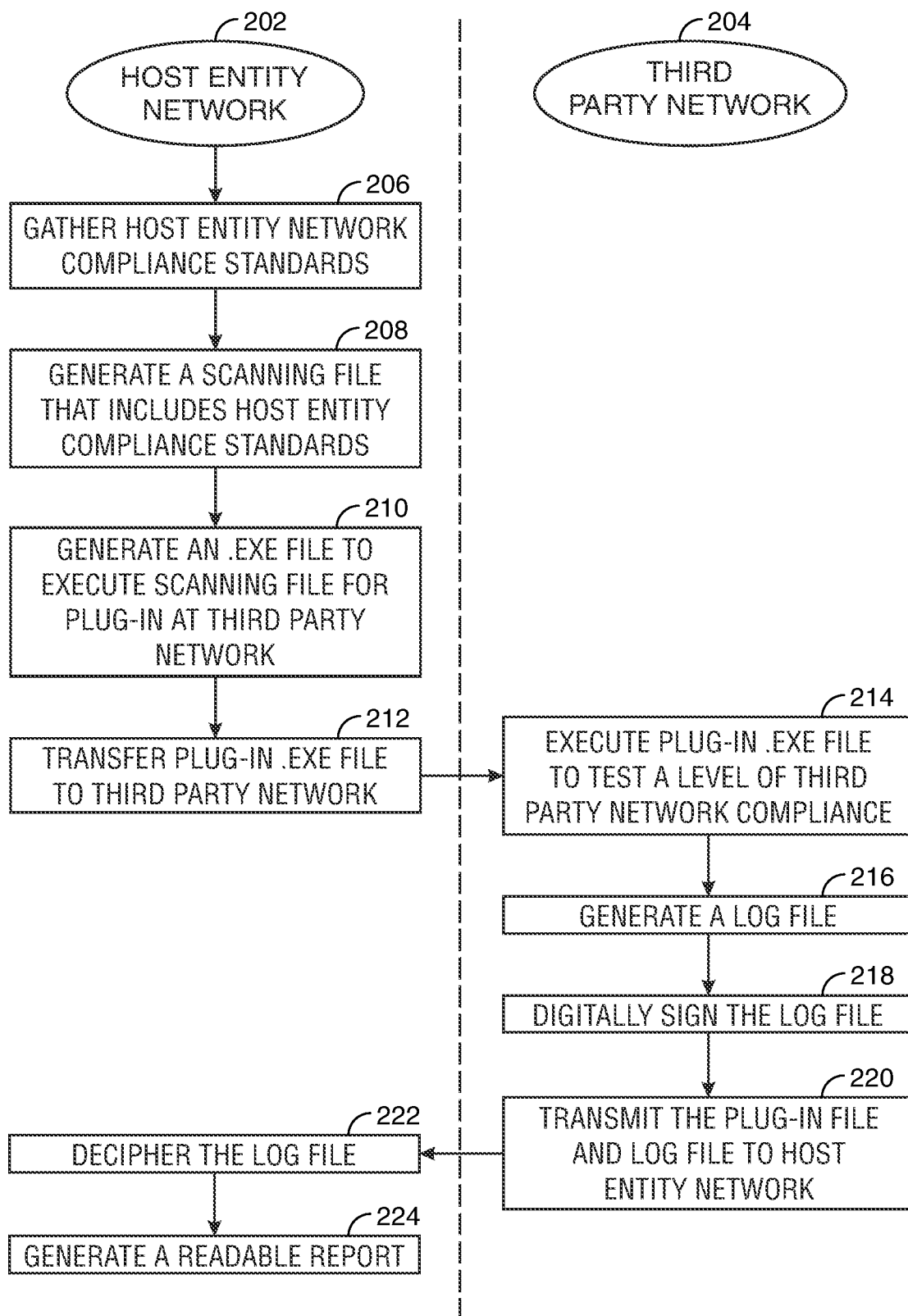
FIG. 2 shows an illustrative flowchart in accordance with principles of the disclosure.

FIG. 2 shows an illustrative flowchart of the method steps that may be included in a third party assessment plug-in system in accordance with principles of the disclosure.

This exemplary flowchart may include a host entity network 202 and a third party network 204.

At step 206, at the host entity network 202, host entity network compliance standards selected by the host entity may be gathered and combined to enable generating a scanning file.

At step 208, at the host entity network 202, the scanning file may be generated.

At step 210, at the host entity network 202, an executable file may be generated. The executable file may be generated to execute the scanning file for plug-in at the third party network.

At step 212, the plug-in executable file may be transferred to the third party network.

At step 214, the plug-in executable file may be executed at the third party network 204. The execution of the plug-in may enable a testing of a level of third party network compliance.

In response to the execution of the plug-in results of the testing may be generated into a log file as shown at 216.

The log file may be digitally signed by the plug-in executable file at the third party network, as shown at 218. Following the digitally signing, the plug-in executable file and the log file may be transmitted to the host entity network, as shown at 220.

At step 222, at the host entity network 202, the log file may be deciphered and a readable report may be generated, as shown at 224.

Figure 3:
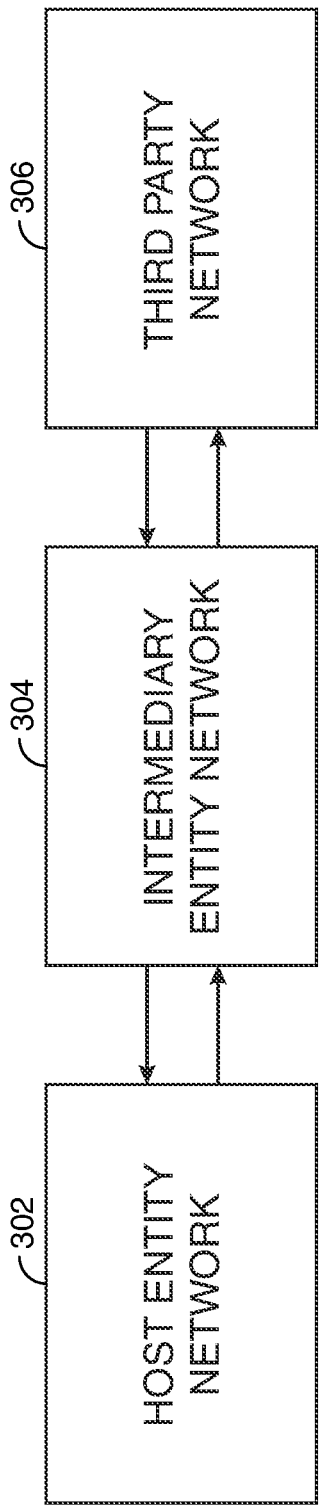
FIG. 3 shows an exemplary system in accordance with principles of the disclosure.

FIG. 3 shows a third party assessment system in accordance with principles of the disclosure.

The system includes a host entity network 302, an intermediary entity network 304 and a third party network 306. It should be appreciated that each of the host entity network, intermediary entity network and third party network may include some or all of the computer hardware and software elements illustrated and described in FIG. 7 and FIG. 8.

Each of the networks 302, 304 and 306 may be in electronic communication and may transfer and receive data to each other. Each of the networks may not be enabled to access any internal data within the other networks.

Figure 4:
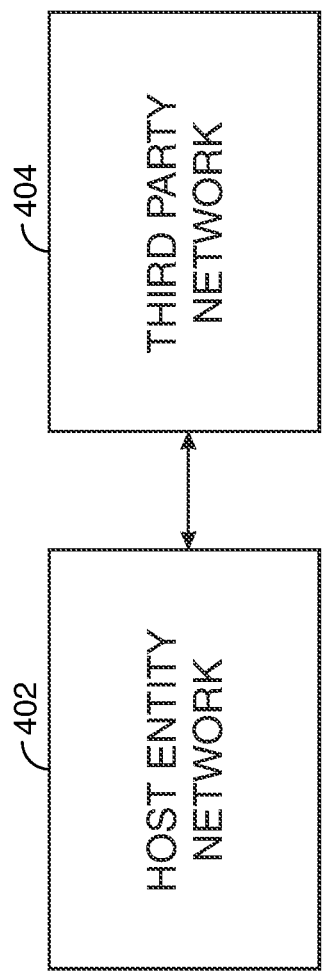
FIG. 4 shows an exemplary system in accordance with principles of the disclosure.

FIG. 4 shows a third party assessment system in accordance with principles of the disclosure.

The system may include a host entity network 402 and a third party network 404. It should be appreciated that the host entity network and the third party network may include some or all of the computer hardware and software elements illustrated and described in FIG. 7 and FIG. 8.

Figure 5:
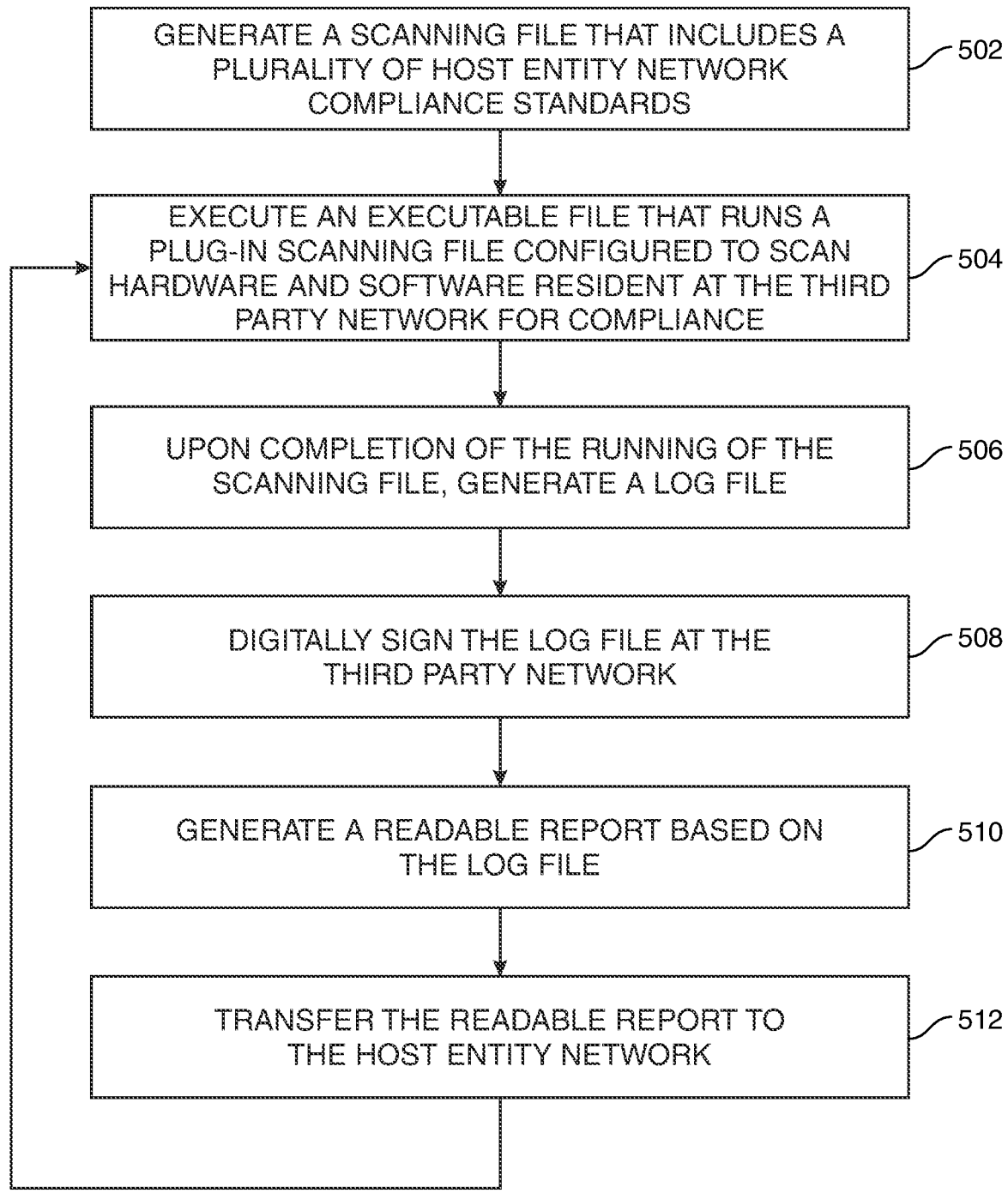
FIG. 5 shows an illustrative flowchart in accordance with principles of the disclosure.

FIG. 5 shows method steps for running an ongoing third party assessment scan in accordance with principles of the disclosure.

At step 502, a scanning file may be generated that includes a plurality of host entity network compliance standards.

The scanning file may be executed at the third party network. Results of the scanning file may be generated into a readable report and transferred back to the host entity network. This may be repeated periodically to enable an ongoing monitoring of the security of the third party network.

Data results from each scanning file may be continuously fed to the host entity network. The host entity network may store the results. The report may display any identified failures at the top of the report and may be displayed in order of a severity of the failure.

Steps 504, 506, 508, 510 and 512 may be a series of actions performed periodically to assess the third party network.

At step 504 an executable file may be executed at the third party network that may be configured to run a plug-in scanning file. The plug-in scanning file may be configured to scan the hardware and software resident at the third party network for compliance.

At step 506, upon completion of the running of the plug-in scanning file, a log file may be generated. The log file may include results of the scanning of the third party network. The results may be in binary format.

At step 508, the log file may be digitally signed at the third party network.

At step 510, a readable report may be generated based on the log file. The readable report may be a conversion of the log file into data that may be understood by a user.

At step 512, the readable report may be transmitted to the host entity network. The readable report, at the host entity network, may be reviewed in an automated system. The readable report may be reviewed manually.

Following step 512, the series of steps may be repeated instantly. The series of steps may be repeated at five minute intervals. The series of steps may be repeated at ten minute intervals. The series of steps may be repeated sixty minute intervals or any suitable time interval determined by the host entity network.

Figure 6:
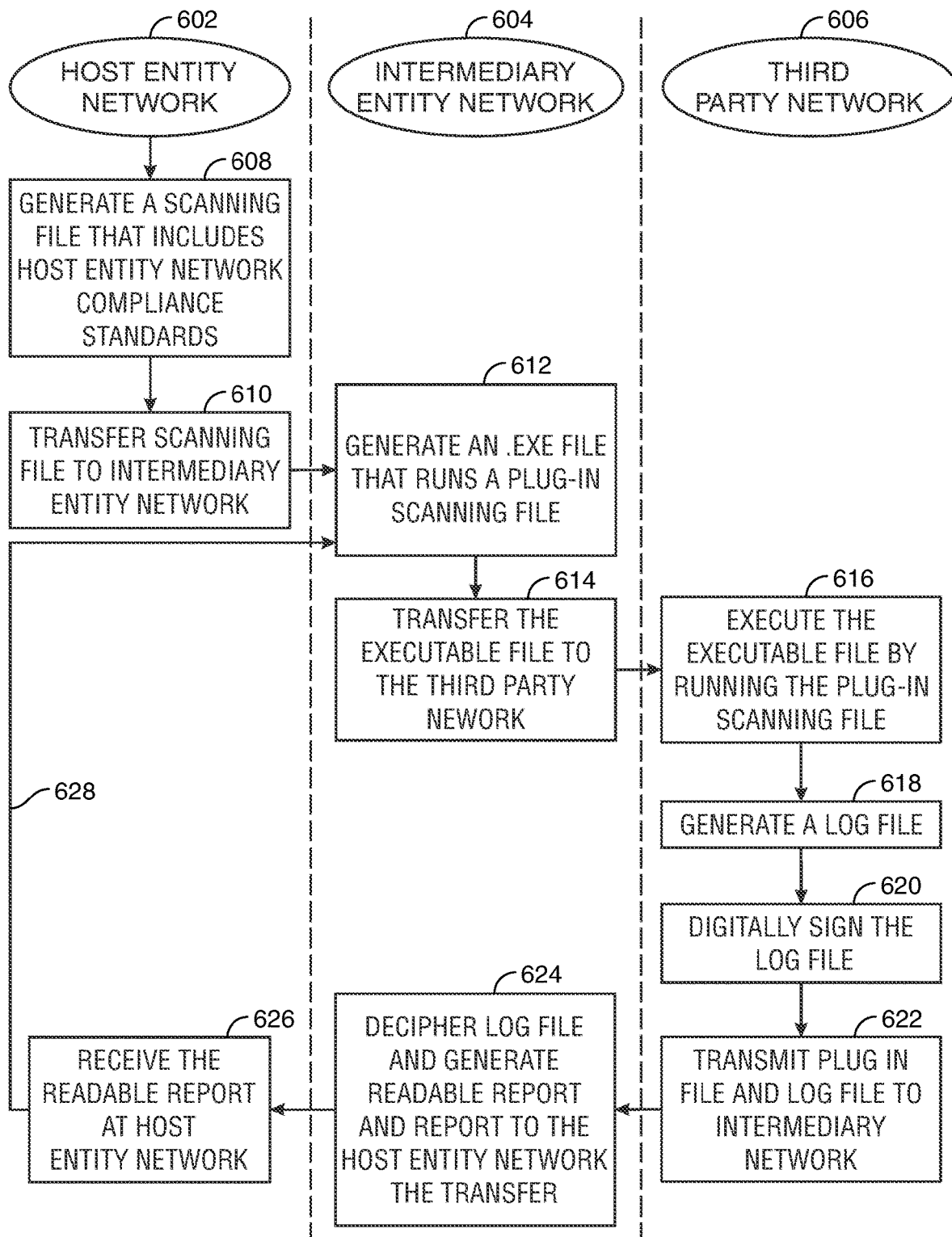
FIG. 6 shows an illustrative flowchart in accordance with principles of the disclosure.

FIG. 6 shows an illustrative flowchart of the method steps that may be included in a third party assessment plug-in system in accordance with principles of the disclosure.

The system may include a host entity network 602, an intermediary entity network 604 and a third party network 606.

Step 608 may be executed at the host entity network 602. At step 608, a scanning file may be generated that includes a plurality of host entity network compliance standards. Generating the scanning file at the host entity network 602 may enable the host entity to create a scanning file in accordance with the host entity network requirements.

At step 610, at the host entity network 602, the scanning file may be transferred to the intermediary entity network 604.

At step 612, at the intermediary entity network 604, an executable file may be generated to execute the scanning file for plug-in at the third party.

At step 614, the plug-in executable file may be transferred to the third party network.

At step 616, at the third party network, the plug-in file may be executed for testing for third party compliance based on the compliance standards included in the scanning file.

Results of the execution of the scanning file may be generated into a log file, as shown at step 618 at the third party network 606.

In order to maintain the log file as is generated and not enable any user to make changes to the log file, the log file may be digitally signed and may convert the log file to an immutable log file, as shown at step 620.

At step 622, the plug-in executable file and the immutable log file may be transmitted to the intermediary network 604.

At step 624, the immutable log file may be deciphered. The deciphering may include converting the binary format of the log file to a readable format. Each '0' and '1' may be converted to a 'pass' or 'fail'. Additionally, the source of the control and/or standard tested may be converted to a name of the location that may be simpler for a user to decipher.

The readable report may be transmitted to the host entity network 602. The host entity network 602 may receive the readable report, as shown at step 626 for review.

In this exemplary diagram, as shown at 628, steps 612-626 may be a series of actions that may be performed at pre-determined intervals to enable real-time identifying of vulnerabilities and failures.

Figure 7:
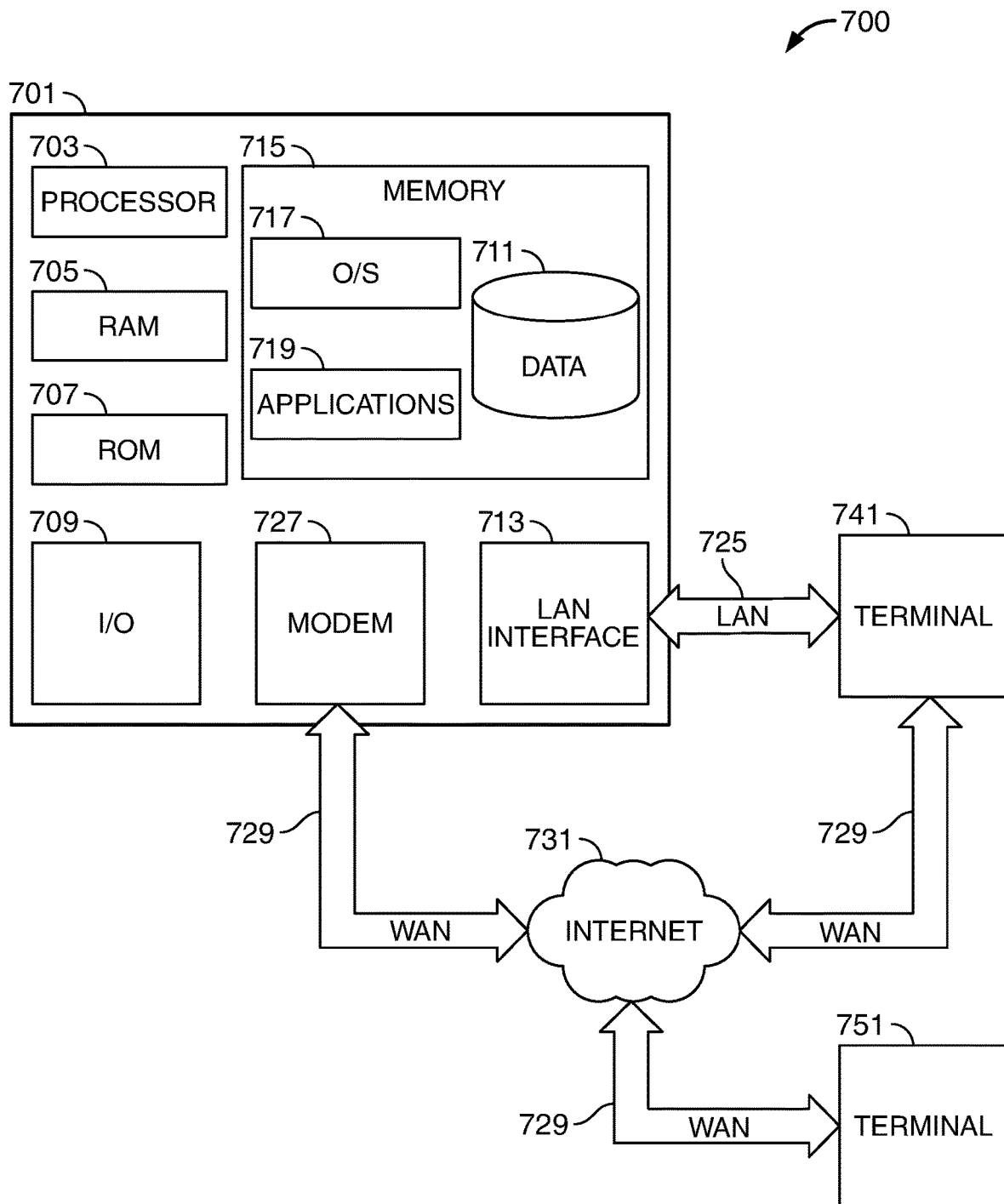
FIG. 7 shows an illustrative diagram of a system in accordance with principles of the disclosure.

FIG. 7 shows an illustrative block diagram of system 700 that includes computer 701. Computer 701 may alternatively be referred to herein as a "server" or a "computing device." Computer 701 may be a workstation, desktop, laptop, tablet, smart phone, or any other suitable computing device. Elements of system 700, including computer 701, may be used to implement various aspects of the systems and methods disclosed herein.

Computer 701 may have a processor 703 for controlling the operation of the device and its associated components, and may include RAM 705, ROM 707, input/output module 709, and a memory 715. The processor 703 may also execute all software running on the computer—e.g., the operating system and/or voice recognition software. Other components commonly used for computers, such as EEPROM or Flash memory or any other suitable components, may also be part of the computer 701.

The memory 715 may be comprised of any suitable permanent storage technology—e.g., a hard drive. The memory 715 may store software including the operating system 717 and application(s) 719 along with any data stored in the database 711 needed for the operation of the system 700. Memory 715 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 701 may execute the instructions embodied by the software to perform various functions.

Input/output ("I/O") module may include connectivity to a microphone, keyboard, touch screen, mouse, and/or stylus through which a user of computer 701 may provide input. The input may include input relating to cursor movement. The input/output module may also include one or more speakers for providing audio output and a video display device for providing textual, audio, audiovisual, and/or graphical output. The input and output may be related to computer application functionality.

System 700 may be connected to other systems via a local area network (LAN) interface 713.

System 700 may operate in a networked environment supporting connections to one or more remote computers, such as terminals 741 and 751. Terminals 741 and 751 may be personal computers or servers that include many or all of the elements described above relative to system 700. The network connections depicted in FIG. 7 include a local area network (LAN) 725 and a wide area network (WAN) 729, but may also include other networks. When used in a LAN networking environment, computer 701 is connected to LAN 725 through a LAN interface or adapter 713. When used in a WAN networking environment, computer 701 may include a modem 727 or other means for establishing communications over WAN 729, such as Internet 731.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 719, which may be used by computer 701, may include computer executable instructions for invoking user functionality related to communication, such as e-mail, Short Message Service (SMS), and voice input and speech recognition applications. Application program(s) 719 (which may be alternatively referred to herein as "plugins," "applications," or "apps") may include computer executable instructions for invoking user functionality related to performing various tasks. The various tasks may be related to interactive IVR hubs. It should be noted that, for the purposes of this application, IVR architecture and/or IVR hubs and/or IVR should be understood to refer to an intelligent front-end/back-end system that aids an agent and/or entity in responding to customer requests.

Computer 701 and/or terminals 741 and 751 may also be devices including various other components, such as a battery, speaker, and/or antennas (not shown).

Terminal 751 and/or terminal 741 may be portable devices such as a laptop, cell phone, Blackberry™, tablet, smartphone, or any other suitable device for receiving, storing, transmitting and/or displaying relevant information. Terminals 751 and/or terminal 741 may be other devices. These devices may be identical to system 700 or different. The differences may be related to hardware components and/or software components.

Any information described above in connection with database 711, and any other suitable information, may be stored in memory 715. One or more of applications 719 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. It should be noted that such modules may be considered, for the purposes of this application, as engines with respect to the performance of the particular tasks to which the modules are assigned.

Figure 8:
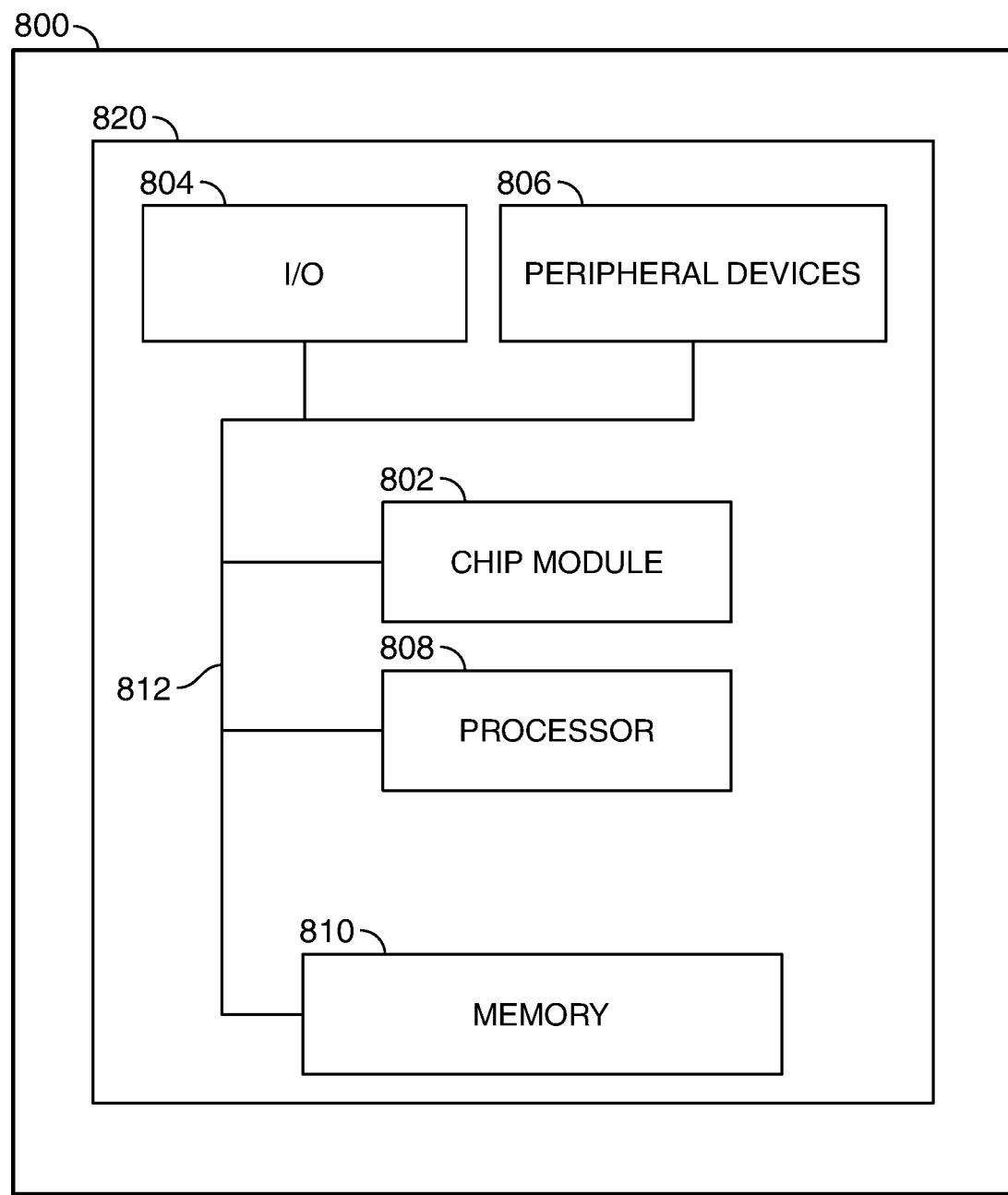
FIG. 8 shows illustrative apparatus that may be configured in accordance with principles of the disclosure.

FIG. 8 shows illustrative apparatus 800 that may be configured in accordance with the principles of the disclosure. Apparatus 800 may be a computing machine. Apparatus 800 may include one or more features of the apparatus shown in FIG. 7. Apparatus 800 may include chip module 802, which may include one or more integrated circuits, and which may include logic configured to perform any other suitable logical operations.

Apparatus 800 may include one or more of the following components: I/O circuitry 804, which may include a transmitter device and a receiver device and may interface with fiber optic cable, coaxial cable, telephone lines, wireless devices, PHY layer hardware, a keypad/display control device or any other suitable media or devices; peripheral devices 806, which may include counter timers, real-time timers, power-on reset generators or any other suitable peripheral devices; logical processing device 808, which may compute data structural information and structural parameters of the data; and machine-readable memory 810.

Machine-readable memory 810 may be configured to store in machine-readable data structures: machine executable instructions (which may be alternatively referred to herein as "computer instructions" or "computer code"), applications, signals, and/or any other suitable information or data structures.

Components 802, 804, 806, 808 and 810 may be coupled together by a system bus or other interconnections 812 and may be present on one or more circuit boards such as 820. In some embodiments, the components may be integrated into a single chip. The chip may be silicon-based.

Thus, methods and apparatus for determining third party network compliance with a host entity network is provided. Persons skilled in the art will appreciate that the present invention can be practiced by other than the described embodiments, which are presented for purposes of illustration rather than of limitation, and that the present invention is limited only by the claims that follow.

What is claimed is:

1. A method for determining third party network compliance with a host entity network, the method comprising:
   gathering host entity network compliance standards, the host entity network compliance standards comprising:
   security assessment standards;
   data movement controls;
   hardware requirements;
   software requirements; and
   configuration settings;
   generating a scanning file that includes the host entity network compliance standards;
   transferring the scanning file to an intermediary entity network;
   generating an executable file that, when executed, runs a plug-in scanning file, the plug-in scanning file for being run at a third-party network, the plug-in scanning file, when run, being configured to scan hardware and software resident at the third-party network for compliance with the host entity network compliance standards;
   transferring the executable file from the intermediary entity network to the third party network;
   executing the executable file, the executing including running the plug-in scanning file, the plug-in scanning file for testing the hardware and software resident at the third party network for compliance with the host entity network compliance standards;
   generating a log file upon a completion of the running of the plug-in scanning file;
   digitally signing the log file, wherein the digitally signing converts the log file to an immutable log file;
   in response to the signing, transmitting the executable file and the immutable log file to the intermediary entity network;
   deciphering the immutable log file at the intermediary entity network;
   based on the deciphering, generating a readable report; and
   transferring the readable report to the host entity network.

2. The method of claim 1 wherein each of the host entity network compliance standards comprises associated controls.

3. The method of claim 1 wherein the immutable log file is a binary log file.

4. The method of claim 1 wherein the intermediary entity network shields a third party network from accessing data at the host entity network.

5. The method of claim 1 wherein the intermediary entity network shields the host entity network from accessing data at the third party network.

6. The method of claim 1 further comprising transferring the readable report to the third party network.

7. The method of claim 1 wherein the immutable log file does not include identifying data associated with the third party network.

8. The method of claim 1 wherein following the transferring of the readable report to the host entity network, the method comprises displaying the readable report on a user interface ("UI") of a host entity network platform.

9. The method of claim 1 wherein, when in response to the deciphering of the immutable log file a failure is identified associated with a configuration setting within the third party network, the method includes updating the configuration setting, via the intermediary entity network, the updating comprising adjusting the configuration setting to match a setting compliance standard set by the host entity network.

10. A method for determining third party network compliance with a host entity network, the method comprising:
   gathering host entity network compliance standards, the host entity network compliance standards comprising:
   security assessment standards;
   data movement controls;
   hardware requirements;

software requirements; and
configuration settings;
generating a scanning file that includes the host entity network compliance standards;
generating an executable file that, when executed, runs a plug-in scanning file, the plug-in scanning file for being run at a third party network, the plug-in scanning file, when run, being configured to scan hardware and software resident at the third party network for compliance with the host entity network compliance standards;
transferring the executable file to the third party network;
executing the executable file, the execution including running the plug-in scanning file, the plug-in scanning file for testing the hardware and software resident at the third party network for compliance with the host entity network compliance standards;
generating a log file upon a completion of the running of the plug-in scanning file;
digitally signing the log file, wherein the digitally signing converts the log file to an immutable log file;
transmitting the executable file and the immutable log file to the host entity network;
deciphering the immutable log file at the host entity network; and
based on the deciphering, generating a readable report.

11. The method of claim 10 wherein each of the host entity network compliance standards comprises associated controls.

12. The method of claim 10 wherein the readable report comprises a pass or fail for each of the associated controls within each of the host entity network compliance standards.

13. The method of claim 10 further comprising transferring the readable report to the third party network.

14. The method of claim 10 wherein the immutable log file does not include identifying data associated with the third party network.

15. A system for determining third party network compliance with a host entity network, the system comprising:
the host entity network configured to:
construct a scanning file that includes host entity network compliance standards stored on the host entity network, the host entity network compliance standards comprising:
security assessment standards;
data movement controls;
hardware requirements;
software requirements; and
configuration settings; and
transmit the scanning file to an intermediary entity network;
the intermediary entity network configured to:
receive the scanning file from the host entity network;
generate an executable file that, when executed, runs a plug-in scanning file, the plug-in scanning file for being run at a third-party network, the plug-in scanning file, when run, being configured to scan hardware and software resident at the third-party network for compliance with the host entity network compliance standards; and
transmit the executable file to the third party network;
the third-party network configured to:
receive the executable file;
execute the executable file, the executing including running the plug-in scanning file, the plug-in scanning file for testing the hardware and software resident at the third party network for compliance with the host entity network compliance standards;
generate a log file upon a completion of the running of the plug-in scanning file;
digitally signing the log file, wherein the digitally signing converts the log file to an immutable log file; and
in response to the signing, transmitting the executable file and the immutable log file to the intermediary entity network; and
the intermediary entity network further configured to:
receive the executable file and the immutable log file;
decipher the immutable log file;
based on the deciphering, generate a readable report; and
transmit the readable report to the host entity network.

16. The system of claim 15 wherein each of the host entity network compliance standards comprises associated controls.

17. The system of claim 15 wherein the intermediary entity network shields a third party network from accessing data at the host entity network.

18. The system of claim 15 wherein the intermediary entity network shields the host entity network from accessing data at the third party network.

19. The system of claim 15 further comprising transferring the readable report to the third party network.

20. The system of claim 15 wherein the immutable log file does not include identifying data associated with the third party network.

* * * * *